Nov. 6, 1951 C. A. NICHOLS 2,574,223
MOLD ASSEMBLY
Filed Nov. 29, 1947 5 Sheets-Sheet 1
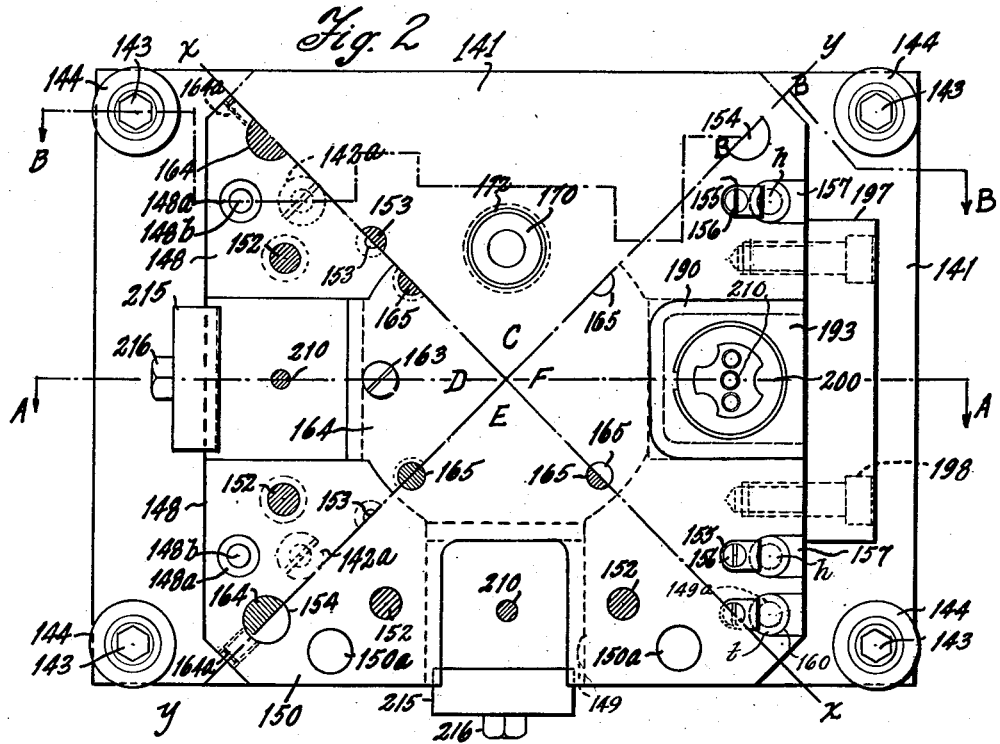
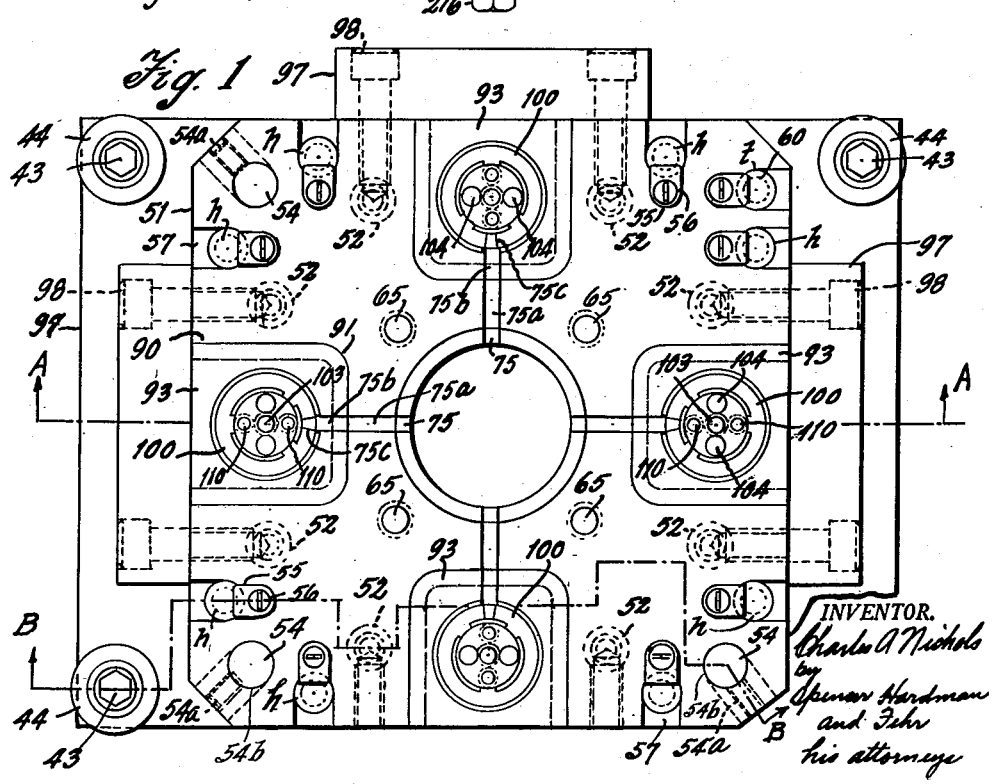
INVENTOR.
Charles A Nichols
by Spencer Hardman
and Fehr
his attorneys Nov. 6, 1951

C. A. NICHOLS 2,574,223

MOLD ASSEMBLY

Filed Nov. 29, 1947

INVENTOR.
Charles A. Nichols
BY
Spencer Hardman + Fehr
his attorneys

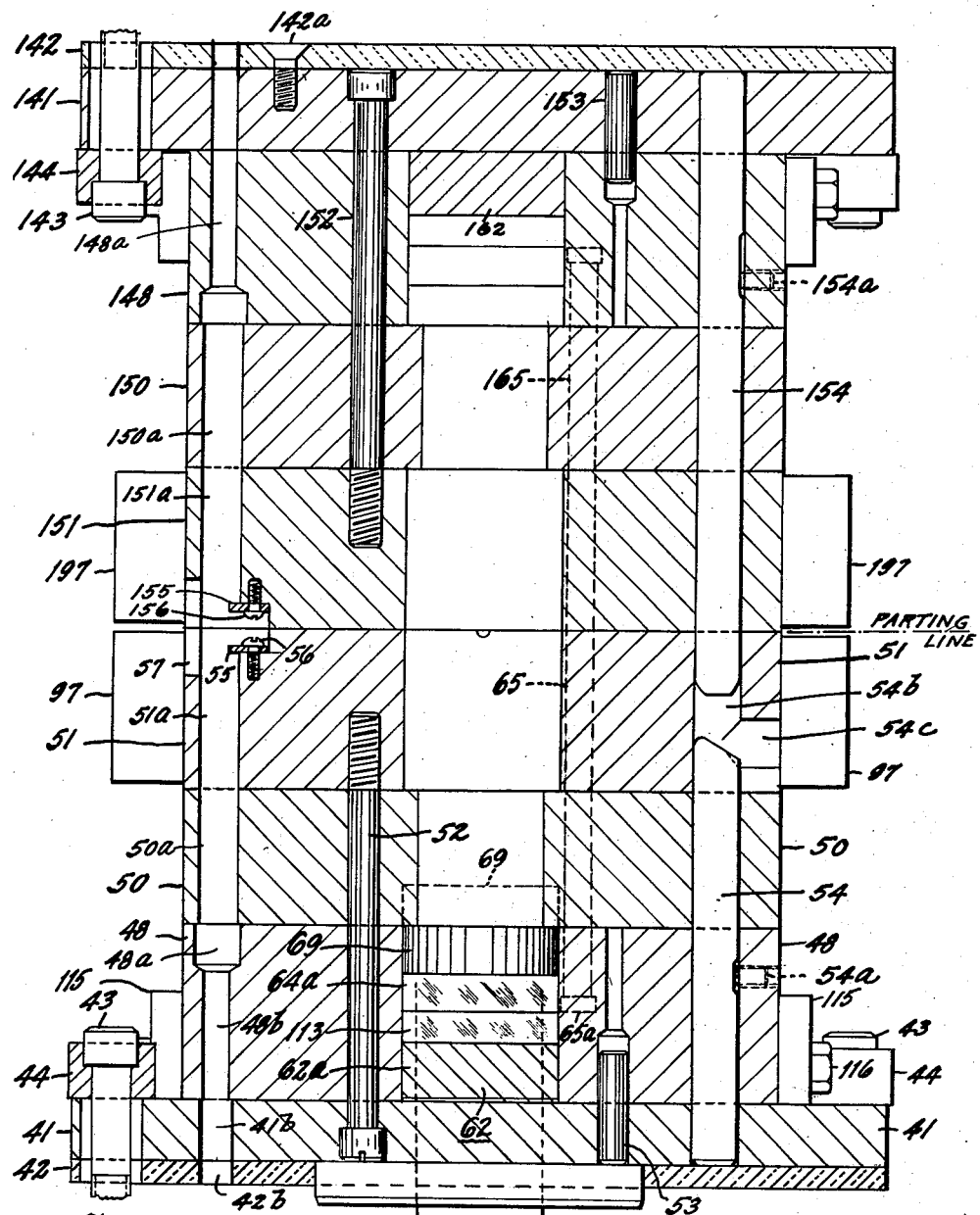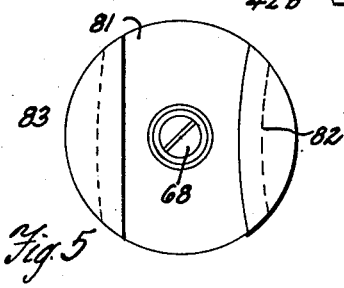

Nov. 6, 1951     C. A. NICHOLS     2,574,223
MOLD ASSEMBLY
Filed Nov. 29, 1947     5 Sheets-Sheet 4
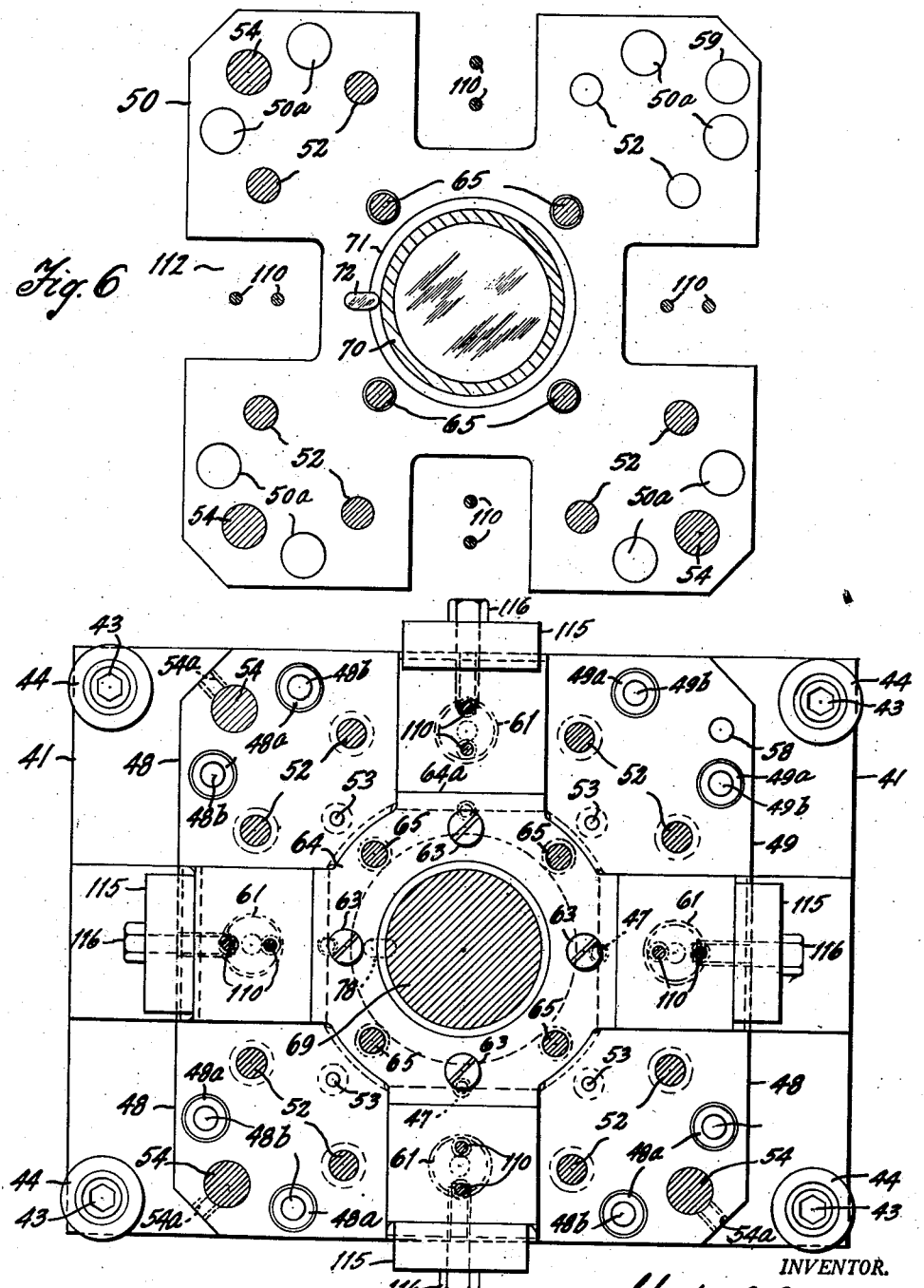
INVENTOR.
Charles A. Nichols
BY
Spencer Hardman & Fehr
his attorneys

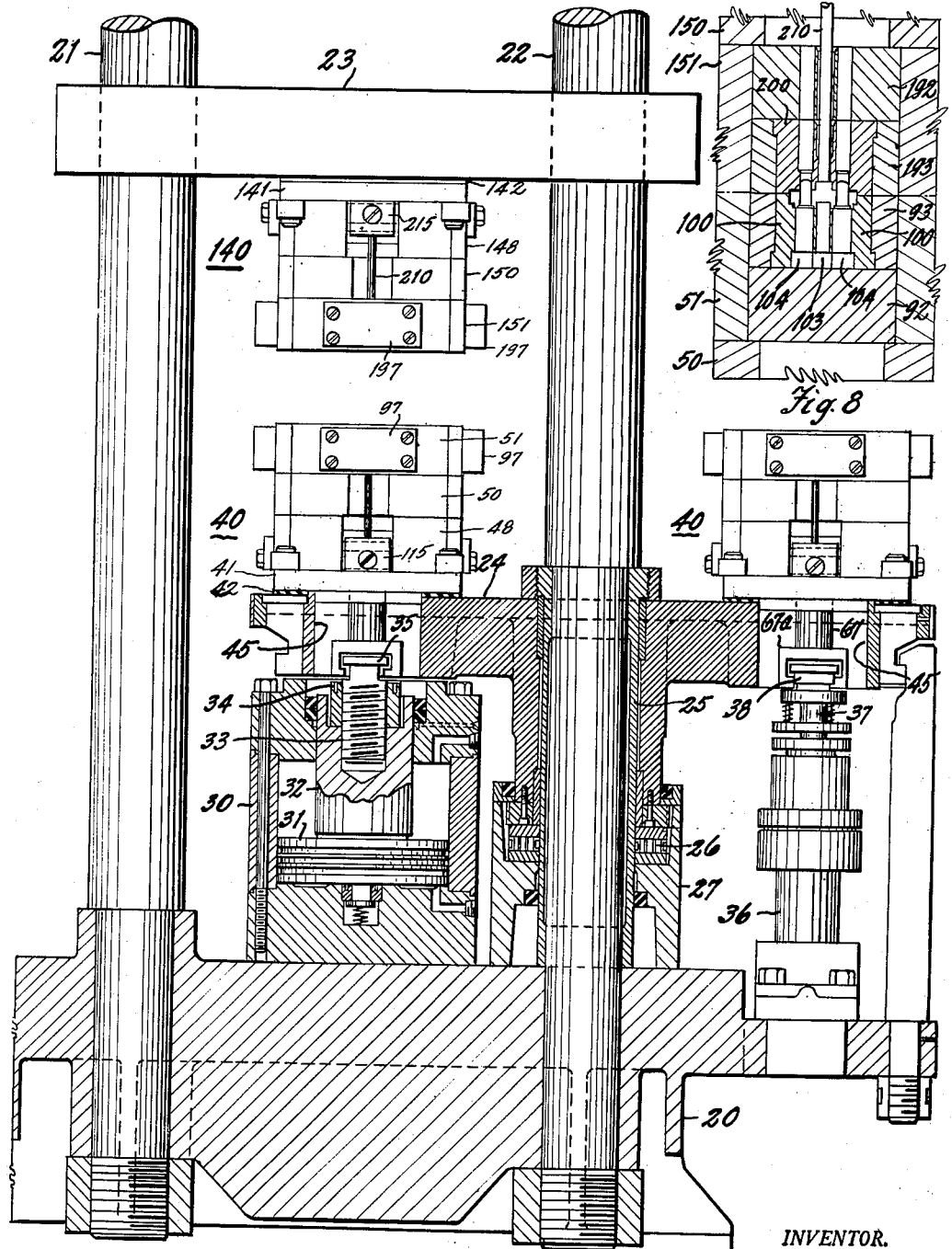

Patented Nov. 6, 1951

2,574,223

UNITED STATES PATENT OFFICE 2,574,223

MOLD ASSEMBLY

Charles A. Nichols, Anderson, Ind., assignor to General Motors Corporation, Detroit, Mich., a corporation of Delaware Application November 29, 1947, Serial No. 788,943

9 Claims. (Cl. 18—42)

This invention relates to molds used in the manufacture of parts molded from thermosetting material.

An object of the invention is to reduce the cost of manufacture of molded equipment by reducing the number of different parts that are required. In the disclosed embodiment of the present invention this object is accomplished by providing mold frames with which dies and their associated knockout pins can be readily assembled without disassembling the mold frames.

Further objects and advantages of the present invention will be apparent from the following description, reference being had to the accompanying drawings wherein a preferred embodiment of one form of the present invention is clearly shown.

In the drawings:

Fig. 1 which is a view on the line G—G of Fig. 3 is a plan view of a lower mold frame constructed in accordance with the present invention;

Fig. 2 is a composite view showing chiefly the upper mold frame. It is divided by diagonal lines $x$—$x$ and $y$—$y$ into segments, C, D, E and F which are views taken respectively on lines C—C, D—D, E—E and F—F of Fig. 3;

Fig. 4 is a sectional view through the upper and lower mold frames and is taken on the lines B—B of Figs. 1 and 2;

Fig. 5 is a view in the direction of arrow 5 of Fig. 4;

Fig. 6 is a sectonal view on the line H—H of Fig. 3;

Fig. 7 is a sectional view on the line J—J of Fig. 3;

Fig. 8 is a fragmentary sectional view on the line 8—8 of Fig. 3;

Fig. 9 is a fragmentary side view of a press equipped with the molds shown in the other figures. The parts in section in Fig. 9 are on a vertical plane intersecting the axes of the posts 21 and 22.

Figure 3:
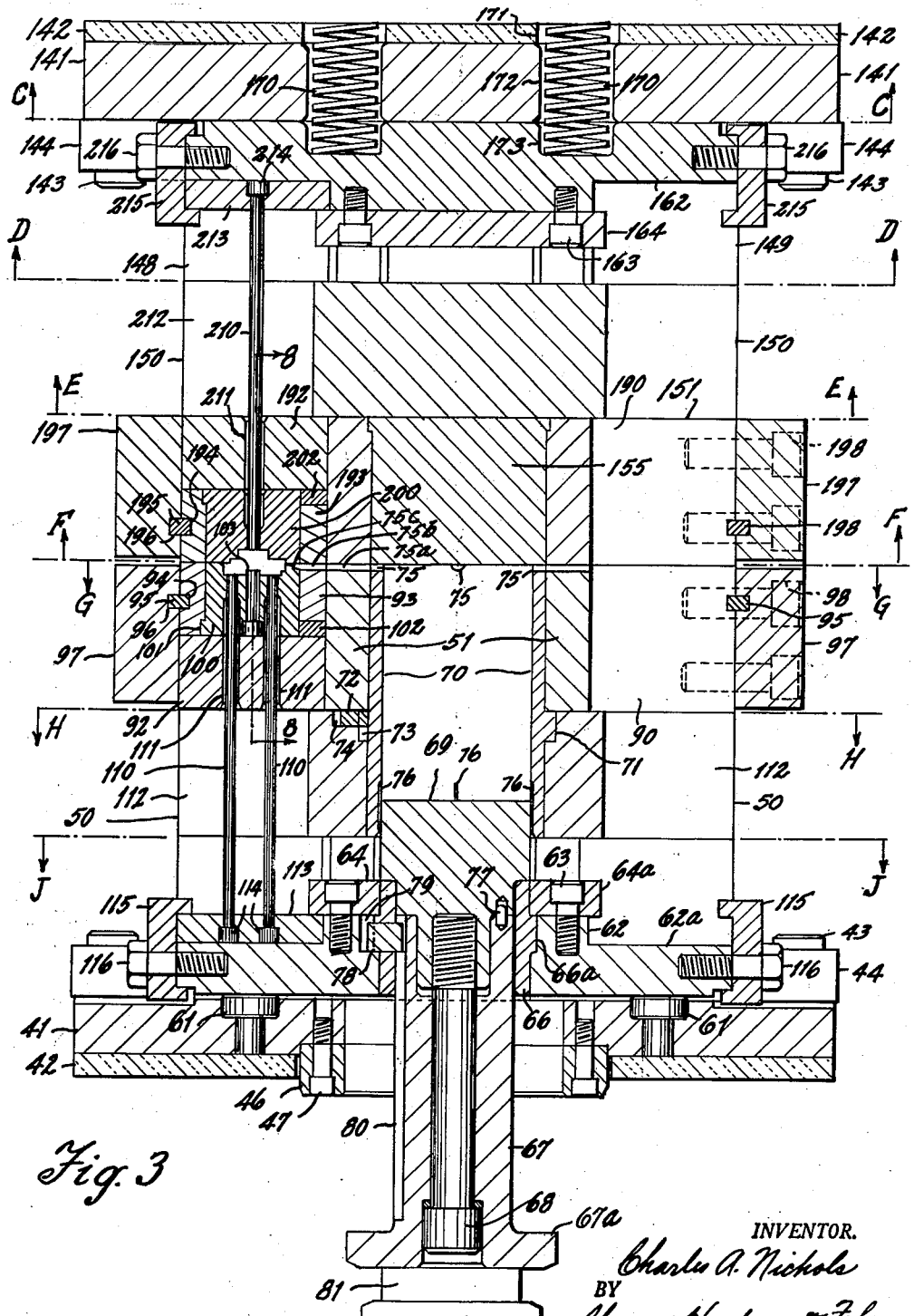
Fig. 3 is a sectional view through both the upper and lower mold frames and is taken on the line A—A of Figs. 1 and 2.

The press shown in Fig. 9 is disclosed in the copending applications of Nichols et al., Serial No. 692,274, filed August 22, 1946, now Patent No. 2,523,137, and Serial No. 774,592, filed September 17, 1947. The press comprises a base 20 supporting posts 21 and 22 which guide for vertical movement a plate 23 which is moved vertically by a hydraulic servomotor, not shown. A turret or table 24 is attached to a bearing sleeve 25 which is journaled on the post 22. The weight of the table and supported parts is taken by a step bearing 26 carried by support 27 resting upon the base 20.

Base 20 supports an injection servomotor comprising a cylinder 30 and a piston 31 whose rod 32 carries a screw 33 secured in adjusted position by nut 34. Screw 33 has a T-head 35 for engaging an injection ram to be described. Base 20 supports an ejection servomotor comprising a cylinder 36 whose piston, not shown, is connected with a rod 37, connected with a T-head 38 adapted to engage an injection ram.

The table 24 supports two lower mold assemblies 40, the left one being at the molding station and the right one being at the loading station.

Referring to Fig. 3, the mold assembly 40 comprises a base plate 41 which together with a heat insulating plate 42 is secured to the table 24 by screws 43 (Fig. 4) passing through washers 44 and through holes in the plates 41 and 42, and threaded into the table 24. Table 24 has locating holes 45 which are diametrically opposite and are equidistant from the axis of rotation of the table. Each hole 45 receives a locating ring 46 which screws 47 attach to the base plate 41. Plate 41 supports three similar blocks 48 and a block 49 which is slightly different (Fig. 7). The blocks 48 and 49 support a block 50 (Fig. 6) and the block 50 supports a block 51 (Figs. 3 and 4). The base 41 and the blocks are secured by screws 52. Accurate location of plate 41, blocks 48, 50 and 51 is afforded by pilot pins 54 which set screws 54a attach to blocks 48. Dowels 53 locate the blocks 48 and 49 relative to the plate 41. Block 51 provides holes 51a in alignment with holes 50a in block 50, in alignment with holes 48a in block 48, or holes 49a in block 49. These aligned holes receive electrical heating elements h (Fig. 1) which are retained by clips 55 attached by screws 56 to block 51. The lead wires of the heating elements are brought out through notches 57 (Fig. 4). The lower portions of holes 48b of blocks 48, or holes 49b of block 49 (Fig. 7) are in alignment with holes 41b in plate 41 and with holes 42b in plate 42. Through these aligned holes a tool may be passed for the purpose of driving out a heating element in case it sticks. Block 49 (Fig. 7) which does not receive a pilot pin 54 has an additional hole 58 in alignment with hole 59 in plate 50 and in alignment with hole 60 in plate 51 (Fig. 1). These aligned holes receive an instrument t, which is responsive to temperature for the purpose of regulating the flow of electric current to the heating elements.

Base 41 supports buttons 61 for receiving the lower surface of plate 62 having parts 62a which extend between the blocks 48 and 49. Screws 63 attach to the plate 62 a plate 64 having parts 64a which extend between the blocks 48 and 49. Plate 64 supports push-back pins 65 (Figs. 4 and 7) which extend through holes in plate 50 and 51 and the upper ends of pin 65 are flush with the upper surface of the block 51. The heads 65a (Fig. 4) of pin 65 are received by holes counterbored in the underside of the plate 64 and these heads are retained due to engagement of plate 64 with plate 62.

Plate 62 is counterbored to receive the flange 66a of a sleeve 66 retained by plate 64. Sleeve 66 provides a guide for a rod 67 which screw 68 secures to a ram 69 operating in a compression cylinder 70 which has a flange 71 (Figs. 3 and 6) received in a counterbore provided by the plate 50. A key 72 locates the cylinder 70 relative to the block 50. Key 72 fits in a notch 73 of the cylinder flange 71 and a recess 74 of block 50. The upper end of cylinder 70 has runner groove 75 and near the lower end thereof cylinder is provided with longitudinal grooves 76 to relieve the vacuum in the cylinder when the ram 69 is moving down. A dowel pin 77 locates the ram 69 with respect to the rod 67 when the screw 68 is turned. The turning of the rod 67 is prevented by a key 78 extending into a recess 79 provided by plate 62 through the sleeve 66 and in a longitudinal groove 80 provided by the rod 67. The lower end of rod 67 has a T-head 81, the sides of which are defined by radial grooves 82 and 83 (Fig. 5) whose center of curvature is in the axis of table 24. The T-slot 81 is adapted to receive either the T-head 35 of screw 33 attached to piston rod 32 or to receive the T-head 38 connected with the piston rod 37 of the knock-out servo which includes the cylinder 36 (Fig. 9).

The block 51 is provided with four rectangular notches 90 (Fig. 1) having rounded corners at 91. Each notch 90 receives a die base block 92 (Fig. 3) which is shaped like the notch and which rests upon the upper surface of block 50. The base block 92 supports a die holder block 93 having a straight slot 94 for receiving a key 95 which fits into a straight slot 96 in a clamp block 97 which screws 98 secure to the block 51. Die block 93 receives a lower cylindrical die member 100 having a flange 101 provided with a notch for receiving a key 102 received also by a notch in the block 93 whereby the die 100 is located. Die 100 is provided with a center pin 103 (Fig. 8) and side pins 104 which respectively define a recess and two openings in the part molded in the die 100. Die 100 provides openings for receiving knock-out pins 110 (Fig. 3) which extend through holes 111 in block 92, through notches 112 provided by block 50, between the blocks 48 and 49, and through holes provided in a plate 113 which are counterbored to receive the lower head ends 114 of pins 110. The four plates 113, one of which is shown in Fig. 3, are secured to plate 62 by clamps 115 attached to plate 62 by screws 116. When the clamps 97 and 115 are removed the loose assembly of the die parts and knockout pins can be removed without disassembling the mold frame. This loose assembly includes die 100, die carrier block 93, the die base block 92, pins 110 and plate 113.

The upper die assembly 140 is constructed somewhat similar to the lower die assembly. It has a heat insulating plate 142 attached to a metal plate 141, which screws and washers 144, secure to the vertically movable plate 23 of the press. The plate 141 supports blocks 148 and 149 corresponding to blocks 48 and 49, a plate 150 corresponding to plate 50 and a plate 151 corresponding to plate 51. Screws 152 secure parts 141, 148, 149, 150, 151 together. Dowels 153 locate the blocks 148, 149 relative to plate 141. There is a cross-shaped plate 162 corresponding to plate 62 to which a plate 164 is attached by screws 163. The plate 151 is provided with notch 190 like notches 90 of plate 51; and each notch 190 receives an upper die 200 located within a die retainer block 193 and located by a key 202. The die retainer block is backed up by a block 192 which is backed by the block 150. The die retainer block 193 has a straight slot 194 which receives a straight key 195 received by a straight slot 196 in a clamp block 197 which screws 198 secure to the block 151. The die 200 provides a hole for receiving a pin 210 passing through a hole 211 in block 192, through the notches 212 provided by block 150, between the blocks 148 and 149 and through a hole in a plate 213 which is counterbored to receive the head 214 of pin 210. Each plate 213 is retained by a clamp 215 which a screw 216 secures to the plate 162. The blocks 150 and 151, 148 and 149 are provided with holes 151a, 150a, 148a and 149a (Figs. 4 and 2) respectively for receiving heating elements h and aligned holes at 160 (Fig. 2) for receiving a temperature responsive instrument t. The plate 164 carries push-back pins 165 which are secured in the manner of pins 65. The holes 54b in block 51 which contain pins 54 (Fig. 4) receive pilot pins 154 which pass through holes in the upper plates and which are secured by set screws 154a to the plates 148. The upper surfaces of pins 54 are slanted as shown in Fig. 4 and the holes 54b are in communication with side openings 54c so that dirt can be blown out by an air nozzle when the upper mold is elevated above the lower. Screws 152 secure to blocks 151, 150, and 148 to the plate 141. Dowel pin 153 locates the blocks 148 and 149 relative to the plate 141. The pilot pins 154 serve also to locate the blocks 151, 150, and 148 relative to the plate 141.

When the molds come together the push-back pins 65 and 165 meet at the parting line of the two dies and push the plate 62 down and the plate 162 up into the position shown in Fig. 3. When the molds separate the plate 162 is pushed down by springs 170 which are located in holes 171 provided by plate 142, holes 172 provided by plate 141 and in recesses 173 provided by plate 162. The upper ends of springs 170 press against the head plate 23.

While the lower mold assembly 40 is at the loading station at the right (Fig. 9) preheated molding material is placed in the cylinder 70, the ram 69 being down. After the table is indexed to bring the filled mold under the upper mold assembly 140 the press head plate 23 is lowered to force the upper mold against the lower mold with pressure and the ram 69 is elevated by the upward movement of the piston 31 which becomes automatically connected with the ram after the table indexes. The heated molding material in the cylinder is compressed by upward movement of the ram 69 and is caused to flow to the cavities of the dies against a center block 155 supported by block 151 (Fig. 3) and bearing against block 150, through the grooves 75 in the upper ends of the piston and extensions thereof which are 75a in block 51 and 75b in blocks 93 and through the more restricted grooves 75c in dies 100. The material is cured under heat and pressure; and, after curing, the ram 69 is caused to descend and the upper mold is caused to ascend. Then the table is indexed and the mold assembly 40 carrying the cured work, is moved to the loading station and another assembly 40 having been charged with preheated molding material is located at the molding station. When the mold assembly 40, first mentioned, is located at the loading station pressure fluid is admitted to the lower end of the cylinder 36 which causes the head 38 to rise to such a distance as to cause the flange 67a of rod 67 to engage the underside of plate 62, and lift it such a distance that the knock-out pins 110 will eject the molded parts from the lower die 100. The molded parts do not stick in the upper die 200 when the upper molds rise because the springs 170 are permitted to expand to push the rod 210 down relative to the die 200 in order to loosen the molded parts from the dies.

From the foregoing description it is apparent that the upper and lower mold assemblies 40 and 140 are so constructed as to permit easy removal of the die assemblies and associated knock-out pin assemblies. After removing the screws 116, 98, 198 and 216 the clamps 115, 97, 197 and 215 are removed; and the die assemblies and their associated knock-out-pin assemblies can be moved laterally from the mold frames and replaced by other die assemblies and suitable knock-out pin assemblies. One set of mold frames can accommodate many different die assemblies and knock-out pin assemblies. If the dies vary in thickness, the blocks 92 and 192 will vary in thickness accordingly so that the recesses 90 and 190 of blocks 51 and 151 respectively will be filled.

While the embodiment of the present invention as herein disclosed, constitutes a preferred form, it is to be understood that other forms might be adopted, all coming within the scope of the claims which follow.

What is claimed is as follows:

1. A mold assembly comprising a supporting frame having side-opening recesses, die-assemblies and knock-out pin assemblies received in said recesses by lateral movement of said assemblies said knock-out pin assemblies including a plate, an ejector plate guided by the frame for movement toward and away from the dies, means carried by the central portion of the ejector plate to provide notches each adapted to receive an edge portion of a pin plate, means for detachably securing the dies within the die receiving recesses of the frame, detachable means for holding an edge portion of the pin plate in one of the notches and also for securing the pin-plate assemblies to the ejector plates, and push-back pins extending through the frame and operatively connected with the ejector plate.

2. A mold assembly according to claim 1 further characterized by a pressure block supported on the central portion which is part of the frame, said block providing shelves to support the die assemblies, said shelves having side-opening recesses through which extend the knock-out pins of the knock-out-pin assemblies.

3. A mold assembly comprising a main supporting plate, a die block supported by the plate and having die receiving recesses extending from side surfaces of the block, an ejector plate movable between the supporting plate and the die block and having parts extending from a central portion and each providing for the reception of a knock-out-pin supporting plate, said central portion having a central boss slightly thicker than the pin-plates, a plate attached to the boss and extending beyond it to provide, in conjunction with the ejector plate, notches each adapted to receive an edge portion of a pin-plate, push-back rods extending through the die block and attached to the plate attached to said boss, die assemblies in said recess of the die block, knock-out-pin assemblies comprising pin plates each located in contact with the ejector plate and having an edge portion in one of said notches and pins extending from each pin plate into a die assembly, clamps detachably secured to the side surfaces of the ejector plate for retaining the pin plates each in said location, and means detachably secured to the side surfaces of the die block for securing the die assemblies in the recesses thereof.

4. A pair of cooperating mold assemblies attachable to relatively movable parts of a press, each assembly including the construction defined by claim 7, and one of them being further characterized by an injection cylinder located in a central bore in the die block, runner grooves provided by the cylinder, die block and die assemblies, an injection ram movable in the injection cylinder, a ram rod attached to the ram and having a longitudinal groove, a ram guide sleeve supported by the ejector plate and retained by the plate which is attached to the ejector plate boss, a key retained by the guide sleeve and extending into the groove, a head provided by the rod and having a T-slot adapted to receive either of two T-head members, one of which is operated by a servo which moves the ram for material injection purposes and the other of which is operated by a servo which moves the head sufficient to cause it to engage the ejector plate for work-ejection purposes, the other of the mold assemblies being further characterized by the provision of spring means effective to move its ejector plate away from its main plate when the mold assemblies are separated.

5. A mold assembly comprising a supporting frame having side-opening recesses; die assemblies having cavities and knock-out pin assemblies received in said recesses by lateral movement of said assemblies; an ejector plate guided by the frame for movement toward and away from the dies; means for detachably securing the dies within the die-receiving recesses of the frame; means for detachably securing the pin-plate assemblies to the ejector plates; push-back pins extending through the frame and operatively connected with the ejector plate; an injection cylinder frame supported centrally of the frame, said frame and die assemblies having runner grooves for connecting the die cavities with the cylinder frame for distributing moldable material from the cylinder to the cavities; a ram operable within said cylinder frame; a rod attached to the ram guided by the ejector plate; and a force receiving member provided by the rod and adapted to engage the ejector plate to actuate same for the purpose of ejecting completed molded parts from the dies.

6. A pair of cooperating mold assemblies attachable to relatively movable main supporting plates, each mold assembly including a die block supported by each plate and spaced therefrom and having recesses extending in from side surfaces of the block, die assemblies in said recesses, means detachably secured to the sides of the die blocks for closing said recesses and securing the die assemblies therein, an ejector plate movable between each main plate and the die block, knock-out pin assemblies detachably secured to the ejector plates and including at least one pin extending into the die assemblies; means detachably secured to the side edges of the ejector plates for retaining the pin assemblies thereon, said die assemblies and pin assemblies being removable together from the mold assemblies when the detachable means are removed, an injection cylinder located in a central bore in one of the die blocks, runner grooves provided by the cylinder, the said one die block and die assemblies, an injection ram movable in the cylinder and guided by the ejector plate associated with said one die block, and means for connecting the ram either with a servomotor which causes the ram to move for the purpose of injecting material in the cylinder when closed by the other mold assembly or with a servomotor which operates, when the mold assemblies are separated, to cause said connecting means to move the ejector plate in order to cause the knock-out pins to eject the molded parts.

7. A pair of cooperating mold assemblies attachable to relatively movable main plates of a press, each assembly including a die block supported by one of the movable main plates and having recesses extending in from the surface of the die block, die assemblies in said recesses, means detachably secured to the sides of the die blocks for closing the recesses and securing the die assemblies therein, an ejector plate movable between each main plate and die block, knock-out pin assemblies secured to the ejector plates and including at least one pin extending into the die assemblies, means detachably secured to the side edges of the ejector plate for retaining the pin assemblies thereon, said die assemblies and pin assemblies being removable together from the mold assemblies when the detachable means are removed; an injection cylinder located in a central bore in one of the die blocks, runner grooves provided by the cylinder, the said one die block and die assemblies; an injection ram movable in the cylinder and guided by the ejector plate associated with said one die block; means for connecting the ram either with a servo which causes the ram to move for the purpose of injecting material in the cylinder when closed by the die block of the other mold assembly or with a servo which operates when the cylinder is not closed, to cause said connecting means to move one of the ejector plates in order to cause the knock-out pins to eject the molded parts; and spring means effective to move the other ejector plate away from its main plate when the mold assemblies are separated.

8. A mold assembly comprising a main supporting plate, a die block supported by the plate and having die receiving recesses extending from the side surfaces of the block, an ejector plate movable between the supporting plate and the die block and having parts extending from a central portion and each providing for the reception of a knock-out pin supporting plate, said central portion having a central boss slightly thicker than the pin-plates, a plate attached to the boss and extending beyond it, said extending portions of the plate cooperating with the ejector plate to provide notches each adapted to receive an edge of a pin-plate, die assemblies in said recesses of the die block, knock-out pin assemblies including pin plates resting on the ejector plate and having an edge portion projecting in one of the notches and pins extending from each pin plate into a die assembly, means detachable from the side surface of the ejector plate for securing the pin plates to the ejector plate, and means detachable from the side surfaces of the die block for securing the die assemblies in the recesses thereof.

9. A pair of cooperating mold assemblies attachable to relatively movable main plates of a press, each assembly including a die block supported by one of the plates and having recesses formed therein; detachable die assemblies secured in said recesses; an ejector plate movable between each main plate and die block; detachable knock-out pin assemblies secured to the ejector plates; an injector cylinder located in a central bore in one of the die blocks; runner grooves provided by the cylinder, the said one die block and die assemblies; an injection ram movable in the cylinder and guided by the ejector plate associated with said one die block; means for connecting the ram either with a servomotor which causes the ram to move for the purpose of injecting material in the cylinder when closed by the die block of the other mold assembly or with another servomotor which operates when the cylinder is not closed, to cause said connecting means to move the ejector plates in order to cause the knock out pins to eject the molded parts; and yieldable means effective to urge the other ejector plate away from its main plate when the mold assemblies are separated.

CHARLES A. NICHOLS.

REFERENCES CITED

The following references are of record in the file of this patent:

UNITED STATES PATENTS

| Number | Name | Date |
|---|---|---|
| 1,909,253 | Claus | May 16, 1933 |
| 1,961,942 | Pack | June 5, 1934 |
| 2,216,060 | Vontobel et al. | Sept. 24, 1940 |
| 2,419,089 | Quarnstrom | Apr. 15, 1947 |